United States Patent [19]

Carlsson et al.

[11] Patent Number: 4,494,758

[45] Date of Patent: Jan. 22, 1985

[54] MECHANICAL SEAL LUBRICATION DEVICE

[75] Inventors: Valdemar Carlsson, Solna; Boris Fredriksson, Huddinge, both of Sweden

[73] Assignee: ITT Industries, Inc., New York, N.Y.

[21] Appl. No.: 592,180

[22] Filed: Mar. 22, 1984

[30] Foreign Application Priority Data

Mar. 24, 1983 [SE] Sweden ................................ 8301618

[51] Int. Cl.³ .......................... F16J 15/42; F16J 15/54
[52] U.S. Cl. ..................................... 277/14 V; 277/67; 277/133; 277/135; 277/237; 384/404
[58] Field of Search ................ 277/3, 13, 14 R, 14 V, 277/25, 59, 67, 68, 70, 79, 133–135, DIG. 1, 237; 384/135, 136, 404

[56] References Cited

U.S. PATENT DOCUMENTS

| 2,002,910 | 5/1935 | Mendenhall et al. | 277/14 V |
| 2,043,885 | 6/1936 | Davidson | 277/133 X |
| 2,166,405 | 7/1939 | Hait | 277/135 X |
| 2,305,648 | 12/1942 | Van Horn | 277/3 X |
| 2,500,454 | 3/1950 | Evans | 277/67 X |
| 2,665,176 | 1/1954 | Brantingham | 384/404 |
| 2,835,123 | 5/1958 | Galinski | 277/67 X |
| 3,004,782 | 10/1961 | Meermans | 277/133 X |
| 3,443,813 | 5/1969 | Carlsson | 277/68 X |
| 3,667,767 | 6/1972 | Bakewell | 277/133 X |
| 4,010,960 | 3/1977 | Martin | 277/3 |

FOREIGN PATENT DOCUMENTS

| 412554 | 5/1910 | France | 277/134 |
| 16442 | of 1907 | United Kingdom | 277/14 V |
| 429328 | 5/1935 | United Kingdom | 384/404 |
| 2040009 | 8/1980 | United Kingdom | 277/134 |

Primary Examiner—Robert S. Ward
Attorney, Agent, or Firm—John T. O'Halloran; Peter R. Ruzek; Mary C. Werner

[57] ABSTRACT

A device for transporting lubricant to the mechanical sealds in a submersible machine includes a funnel shaped guide means arranged on a rotating shaft in an oil room. Oil will be sucked in at the small end of the guide means and flow out at its big end thus obtaining a transport of oil.

4 Claims, 1 Drawing Figure

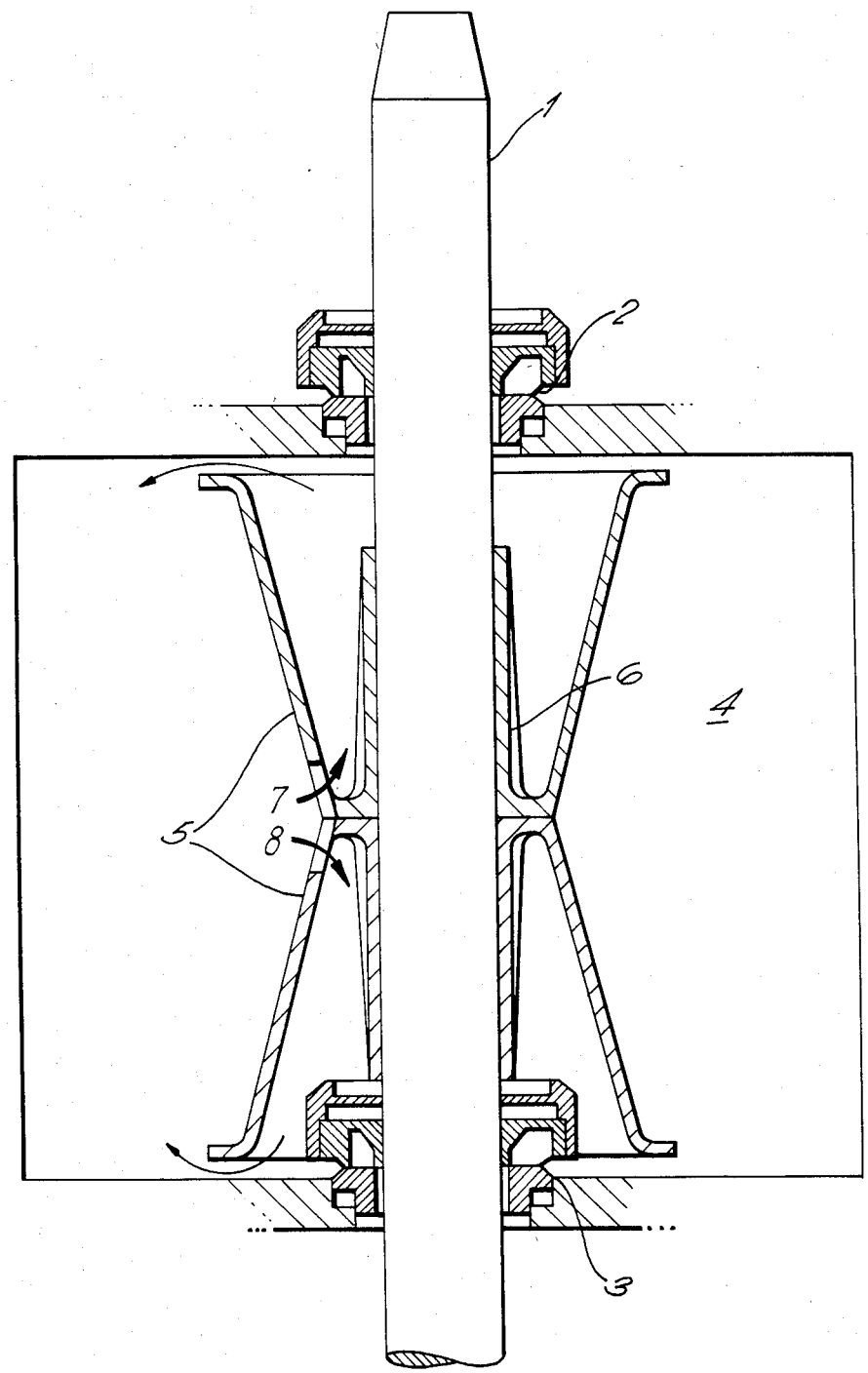

MECHANICAL SEAL LUBRICATION DEVICE

BACKGROUND OF THE INVENTION

This invention concerns a device to be used in connection with mechanical seals meant to seal the lead-in of a rotating shaft between two rooms containing different media.

Mechanical seals are often used in submersible electrically operated machines, such as pumps, turbines and mixers, to seal the driving shaft between driving unit and hydraulic unit, the shaft normally going through an oil room between the units. The seals, one between driving unit and oil room and one between oil room and hydraulic unit, contain one rotating and one non-rotating seal ring which are pressed towards each other by spring force.

The spring force must be relatively strong to secure a good sealing. Lubricant must be brought continuously to the contact surfaces. Oil is usually used as the lubricant which is contained in the oil housing.

In a submersible pump of a conventional type where the driving unit is arranged on top of the pump housing, there is normally no problem bringing lubricant to the seals since these are usually covered by the oil in the oil housing. If the driving unit is arranged under or beside the hydraulic unit, problems with bringing the oil to the seals may occur.

A way to solve this problem is to arrange a pumping device of some sort to bring oil up to the upper seal (Swedish Pat. No. 7401606-4). This known device does not however function if the driving shaft takes an essentially horizontal position.

SUMMARY OF THE INVENTION

In general, it is an object of the present invention to overcome the disadvantages of the prior art.

It is a further object to provide a device for transporting oil to a seal situated above the surface in the oil room in a submersible machine.

In pursuance of these objects, one feature of the present invention resides in an arrangement for lubricating a mechanical seal surrounding a rotatable shaft comprising a container for holding a liquid lubricant, located adjacent the seal and receiving at least a portion of the shaft, and means for transporting the liquid lubricant to the seal, the transporting means being located in the container and being mounted on the shaft for joint rotation therewith.

BRIEF DESCRIPTION OF THE DRAWING

Above-mentioned and other features and objects of this invention will become more apparent by reference to the following description taken in conjunction with the accompanying sole drawing which illustrates a cross-sectional view of the arrangement of the present invention.

DESCRIPTION OF THE PREFERRED EMBODIMENT

A shaft 1 is sealed by two mechanical seals 2 and 3. Two funnel formed guide means 5 having fins 6 located thereon are situated in an oil room 4.

In the shown embodiment the driving shaft 1 is arranged vertically and the upper seal 2 is situated above the surface in the oil room 4. The two guide means 5 are rigidly connected to the shaft and thus rotate with the latter. The guide means 5 have openings 7 and 8 at the top and bottom respectively through which the liquid may be transported.

When the shaft 1 rotates, the liquid is brought into the guide means 5 which action is increased by the fins 6 within the guide. Due to the funnel form of the guide means 5, the liquid is transported upwards in the upper guide and downwards in the lower guide by centrifugal force, thus obtaining a flow according to the arrows in the drawing. This means that a sufficient oil support to the upper seal is always obtained as long as the level in the oil room 4 is somewhat above the middle, that is, level with the openings 7 in the lower part of the upper guide means 5.

If the shaft is horizontal, oil will in a similar way be transported in the guide means 5 as long as the oil is level with the shaft 1.

According to the invention a device is obtained which in a simple way provides for a secure oil transport to the seals in a submersible machine, even if the level in the oil housing decreases to about one half.

While we have described above the principles of our invention in connection with specific apparatus, it is to be clearly understood that this description is made only by way of example and not as a limitation to the scope of our invention as set forth in the objects thereof and in the accompanying claims.

We claim:

1. An arrangement for lubricating a mechanical seal surrounding a rotatable shaft, comprising:
    a container for holding a liquid lubricant, located adjacent the seal and receiving at least a portion of the shaft; and
    means for transporting the liquid lubricant to the seal, said transporting means being located in the container, being mounted on the shaft for joint rotation therewith, and including at least one element secured to the shaft and extending substantially coaxially therewith, said element having two axially spaced end portions each having at least one opening therein, and bounding an internal passage which diverges from one of said end portions to the other of said end portions that is directed towards the seal.

2. The arrangement as claimed in claim 1 wherein said transporting means further includes fin portions located in said element and surrounding said shaft and oriented to increase transport of the liquid lubricant towards the other of said end portions.

3. An arrangement for lubricating at least two mechanical seals spaced in distance from one another and surrounding a rotatable shaft, comprising:
    a container for holding a liquid lubricant, located between the seals and adjacent thereto, and receiving at least a portion of the shaft; and
    means for transporting the liquid lubricant to the seals, said transporting means being located in the container, being mounted on the shaft for joint rotation therewith, and including at least two elements secured to the shaft and extending substantially coaxially therewith, each of said elements having two axially spaced end portions each having at least one opening therein, and bounding an internal passage which diverges from one of said end portions to the other of said end portions that is directed towards a respective one of the seals.

4. The arrangement as claimed in claim 3 wherein said means further includes fin portions located in each of said elements and surrounding said shaft and oriented to increase transport of the liquid lubricant towards the other of said end portions.

* * * * *